United States Patent
Wesemann

(10) Patent No.: US 7,673,133 B2
(45) Date of Patent: Mar. 2, 2010

(54) VIRTUAL PRIVATE NETWORK BETWEEN COMPUTING NETWORK AND REMOTE DEVICE

(75) Inventor: Darren L. Wesemann, North Salt Lake, UT (US)

(73) Assignee: Intellisync Corporation, San Jose, CA (US)

(*) Notice: Subject to any disclaimer, the term of this patent is extended or adjusted under 35 U.S.C. 154(b) by 906 days.

(21) Appl. No.: 10/794,243

(22) Filed: Mar. 5, 2004

(65) Prior Publication Data

US 2004/0255164 A1   Dec. 16, 2004

Related U.S. Application Data

(63) Continuation-in-part of application No. 09/767,465, filed on Jan. 22, 2001, now Pat. No. 7,124,189, application No. 10/794,243.

(60) Provisional application No. 60/257,481, filed on Dec. 20, 2000, provisional application No. 60/452,248, filed on Mar. 5, 2003.

(51) Int. Cl.
   *G06F 11/30* (2006.01)
(52) U.S. Cl. .......................... 713/151; 726/15
(58) Field of Classification Search ............... 713/151; 726/15
   See application file for complete search history.

(56) References Cited

U.S. PATENT DOCUMENTS

| | | | |
|---|---|---|---|
| 5,142,622 A | 8/1992 | Owens | |
| 5,594,869 A | 1/1997 | Hawe et al. | |
| 6,032,227 A | 2/2000 | Shaheen et al. | |
| 6,061,796 A | 5/2000 | Chen et al. | |
| 6,081,900 A | 6/2000 | Subramaniam et al. | |
| 6,092,113 A | 7/2000 | Maeshima et al. | |
| 6,092,200 A | 7/2000 | Muniyappa et al. | |
| 6,104,716 A * | 8/2000 | Crichton et al. ............. 370/401 |
| 6,138,049 A | 10/2000 | McLaughlin | |
| 6,173,399 B1 | 1/2001 | Gilbrech | |
| 6,178,505 B1 | 1/2001 | Schneider et al. | |
| 6,226,748 B1 | 5/2001 | Bots et al. | |
| 6,229,809 B1 | 5/2001 | Murphy | |
| 6,233,608 B1 | 5/2001 | Laursen et al. | |
| 6,292,839 B1 | 9/2001 | Naudus et al. | |
| 6,292,905 B1 | 9/2001 | Wallach et al. | |
| 6,295,551 B1 | 9/2001 | Roberts et al. | |
| 6,332,195 B1 | 12/2001 | Green et al. | |
| 6,411,986 B1 * | 6/2002 | Susai et al. ................. 709/203 |

(Continued)

OTHER PUBLICATIONS

Stalings "Cryptography and Network Security Principles and Practices" Prentice Hall 1999.*

(Continued)

*Primary Examiner*—Benjamin E Lanier
*Assistant Examiner*—Devin Almeida
(74) *Attorney, Agent, or Firm*—Alston & Bird LLP

(57) ABSTRACT

A secure connection between a computer network and a remote device is provided by a carrier network between the computer network and the remote device. The secure connection includes data tunnels that operate as virtual private networks between the corporate network and the carrier network and between the remote device and the carrier network. In addition, communication protocols can be used to enable data requests and data transmission over the secure connection, optionally through ports on the computer network that are opened for Web traffic.

46 Claims, 6 Drawing Sheets

U.S. PATENT DOCUMENTS

| | | | |
|---|---|---|---|
| 6,430,604 B1 * | 8/2002 | Ogle et al. ................... | 709/207 |
| 6,473,411 B1 | 10/2002 | Kurnaki et al. | |
| 6,529,500 B1 | 3/2003 | Pandharipande | |
| 6,546,425 B1 | 4/2003 | Hanson et al. | |
| 6,563,800 B1 * | 5/2003 | Salo et al. ................... | 370/264 |
| 6,594,246 B1 | 7/2003 | Jorgensen | |
| 6,609,148 B1 | 8/2003 | Salo et al. | |
| 6,631,416 B2 | 10/2003 | Bendinelli et al. | |
| 6,704,768 B1 | 3/2004 | Zombek et al. | |
| 6,765,881 B1 | 7/2004 | Rajakarunanayake | |
| 6,801,509 B1 | 10/2004 | Chuah et al. | |
| 6,874,030 B1 | 3/2005 | Sheth et al. | |
| 7,116,662 B2 | 10/2006 | Joung | |
| 7,313,822 B2 * | 12/2007 | Ben-Itzhak ................... | 726/24 |
| 2001/0039587 A1 * | 11/2001 | Uhler et al. ................... | 709/229 |
| 2002/0010866 A1 | 1/2002 | McCullough et al. | |
| 2002/0023210 A1 | 2/2002 | Tuomenoksa et al. | |
| 2002/0161904 A1 | 10/2002 | Tredoux et al. | |
| 2004/0148425 A1 | 7/2004 | Haumont et al. | |
| 2004/0255164 A1 | 12/2004 | Wesermann | |
| 2008/0140847 A1 | 6/2008 | Almog | |

OTHER PUBLICATIONS

Aqun et al. "*Research on Tunneling Techniques in Virtual Private Networks*", IEEE, Aug. 2000, pp. 691-697, especially pp. 692-696.

Cobb, S., "*Security Issues in Internet Commerce*", IEEE, Jul. 1996, pp. 186-191.

U.S. Appl. No. 10/884,412, filed Jul. 2, 2004, Darren L. Wesemann, et al.

Okada et al., "Achieving High Scalability in VPN-Exchange, a Method of Constructing Star-type End-to-end VPN", Research Report, Feb. 15, 2002, NTT Information Sharing Platform Laboratories, pp. 115-120, vol. 2002, No. 12, Information Processing Society of Japan.

Japanese Office Action, corresponding to Japanese Patent Application No. 2006/501219; pp. 1-5.

\* cited by examiner

VIRTUAL PRIVATE NETWORK BETWEEN COMPUTING NETWORK AND REMOTE DEVICE

CROSS-REFERENCE TO RELATED APPLICATIONS

This application is a continuation-in-part of U.S. application Ser. No. 09/767,465, filed Jan. 22, 2001, which claims the benefit of U.S. Provisional Application Ser. No. 60/257,481, filed Dec. 20, 2000; and also this application claims the benefit of U.S. Provisional Application Ser. No. 60/452,248, filed Mar. 5, 2003, which is incorporated herein by reference in its entirety.

BACKGROUND OF THE INVENTION

1. The Field of the Invention

The present invention generally relates to virtual private networks. In particular, the present invention relates to systems and methods for enabling both the exchange of data and the execution of software applications remotely via a virtual private network.

2. The Related Technology

In today's business world, many businesses protect their data from unauthorized access by installing firewalls into their network infrastructure. Typically, a firewall is configured to prevent unidentified users from accessing network data from a remote location. Although firewalls are generally very beneficial for enabling a business to have more control over who accesses its network data, they also have the undesirable consequence of disconnecting mobile professionals from critical and urgent business information when they are away from the office or otherwise unable to gain local access to the network data.

To enable a mobile professional to access business information from a remote location, some businesses have installed virtual private networks (VPNs) between the business and designated remote locations, such as from a professional's home or satellite office. The function of a VPN is to open a secure connection between the business network and a designated remote location through the business firewall. Although beneficial for providing remote access to network data, a VPN requires the installation of expensive hardware and/or software at the business network and sometimes at the remote location.

In typical VPN arrangements, a user communicates with a business network from a remote location through a VPN tunnel. At each end of the VPN tunnel is a VPN node. At the business network, one of the VPN nodes straddles the business network's firewall. Network data is transmitted through the firewall at the VPN node and through the VPN tunnel to the user. According to the prior art, it is also possible for a remote business to communicate with the business network through a second VPN tunnel between the two VPN nodes.

VPN hardware and software employ encryption technology and other security features at the VPN nodes to ensure that data transmitted through a VPN tunnel is not intercepted and that the user or remote business is authorized to access the business network data. The benefits of a VPN, however, are limited to discrete, remote locations where the appropriate VPN software and/or hardware is installed. Accordingly, VPNs do not currently provide users with mobile remote access to network data stored behind business firewalls. In particular, a prior art VPN does not readily enable a user to access network data from a telephone while commuting in a moving vehicle, or from various other mobile devices, including pagers, personal digital assistants ("PDAs"), and laptop computers.

With regard to the aforesaid mobile devices, it is highly desirable in today's mobile society to provide enhanced connectivity between such devices and a remote location, such as a business network at the user's place of employment. Specifically, the ability for such mobile devices to remotely and securely exchange both data and applications with the business network greatly enhances both their utility and value, particularly for mobile professionals and others who spend a significant amount of time away from the office. As already described, typical VPN configurations do not readily enable such mobile remote connectivity.

Further complicating the secure transfer of data between a remote device and the business network is the fact that the remote device and business network may employ respectively differing communication protocols for transmitting data. For example, an e-mail application locally based in a business network may employ the Messaging Application Programming Interface ("MAPI") protocol for exchanging e-mail messages to network users. A remote device, such as a PDA, however, may use the differing Post Office Protocol ("POP") for retrieving, sending, and reading e-mail. Without resolution, the incongruity of the two protocols renders communication between the remote and local devices impossible.

In view of the foregoing, a need currently exists for providing a simple means by which secure communication can be transacted between a local host device and a remote device without the attendant problems discussed above. In addition, such a means should provide for the ability to exchange data and/or share applications between the host and remote device even in cases where differing protocols are respectively employed.

BRIEF SUMMARY OF THE INVENTION

The present invention relates to systems and methods for establishing a secure connection between a computer network and a remote device. The present invention further extends to secure communication between local and remote devices that is enabled via a carrier network and a spontaneous virtual private network established between the devices. Additional embodiments of the present invention include secure exchange of data between local and remote devices via communication protocols. Embodiments of the invention include, but are not limited to, opening data tunnels that operate as virtual private networks between the corporate network and a carrier network and between the remote device and the carrier network, optionally using the communication protocols.

Accordingly, a first example embodiment of the invention is a method for transmitting data in a secure manner between a computing network and a remote device, each of the computing network and the remote device including a tunneling client. The method generally includes: establishing a first data tunnel leg between a tunneling client of the computing network and a tunneling server of a carrier network; establishing a second data tunnel leg between the tunneling server of the carrier network and a tunneling client of the remote device; and transmitting data between the remote device and the computing network via the first and second data tunnel legs and the carrier network using a first template associated with a first protocol, the first template being used by the tunneling client of the computing network, and a second template associated with the first protocol, the second template being used by the tunneling of the remote device.

A second example embodiment of the invention is performed in a carrier network capable of communicating with a corporate network and a remote device. This embodiment relates to a method for enabling the remote device to access network data of the computing network. The method generally includes: receiving a first connection signal from a computing network; in response to the first connection signal, establishing a first data tunnel leg between the carrier network and the computing network; receiving a second connection signal from a remote device; and in response to the second connection signal, establishing a second data tunnel leg between the carrier network and the remote device, the first data tunnel leg and the second data tunnel leg together operating as a virtual private network.

A third example embodiment of the invention is performed in a device, such as a mobile or cellular phone, PDA, pager, laptop computer, etc. This embodiment relates to a method for enabling a user operating the device to access network data of a remote computing network. The method generally includes: transmitting a connection signal from the tunneling client of the device to a tunneling server of the carrier network, wherein a first data tunnel leg has already been established between the tunneling server and the remote computing network; and upon the establishment of a second data tunnel leg between the computing network and the carrier network in response to the connection signal, transmitting a data request via the second data tunnel leg to the carrier network using a first template that is associated with a first protocol and is used by the tunneling client of the device. In this embodiment, the remote computing network receives the data request from the carrier network via the first data tunnel leg. In addition, the remote computing network processes the data request using a second template associated with the first protocol.

Yet another example embodiment of the invention is performed in a computing network, such as an enterprise or corporate network. This embodiment relates to a method for enabling a user operating a remote device to access network data of the computing network. This embodiment generally includes: transmitting a first connection signal from a tunneling client of the computing network to a carrier network; upon the establishment of a first data tunnel leg between the computing network and the carrier network, transmitting a keep alive signal from the computing network to the carrier network to maintain the first data tunnel leg; and receiving a data request from a remote device via the first data tunnel leg and a second data tunnel leg located between the carrier network and a remote device. In this embodiment, the data request is transmitted using a first template associated with a first protocol, the first template being used by the tunneling client of the computing network, and a second template associated with the first protocol, the second template being used by a tunneling client of the remote device.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
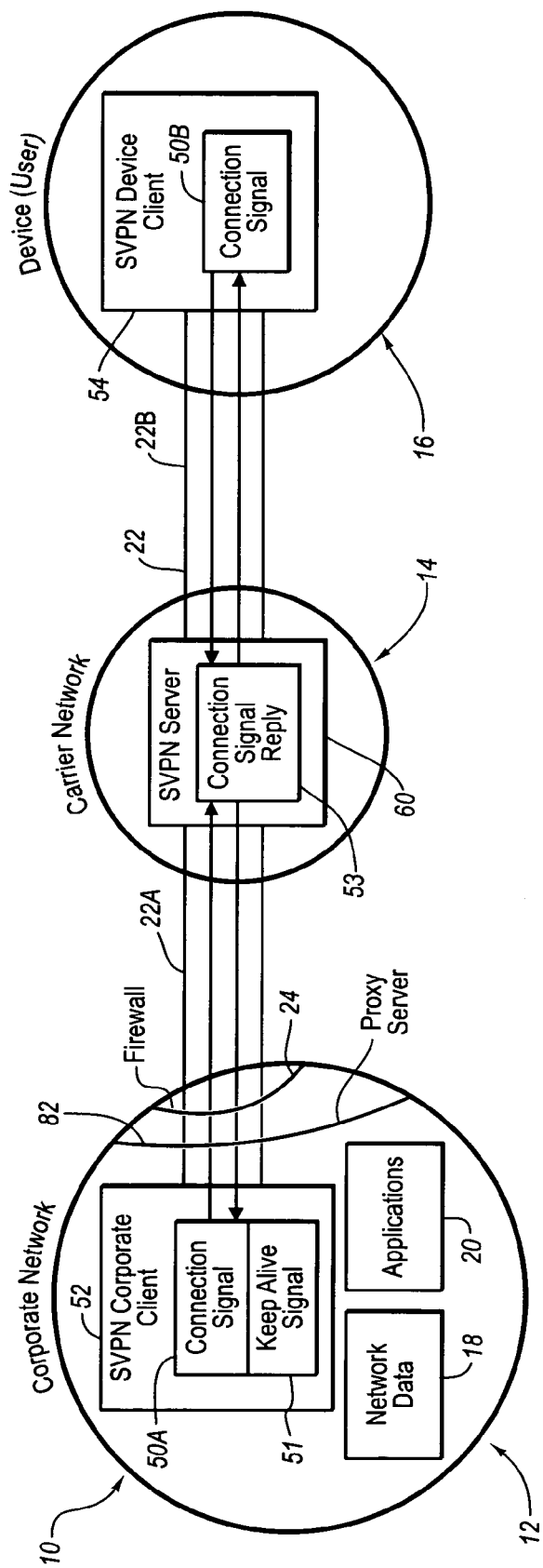
FIG. 1 is a block diagram illustrating various components employed in a system for enabling secure communication between a local host device or network and a remote device, the system being shown in a first state.

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-5 depict various features of embodiments of the present invention, which is generally directed to systems and methods for establishing a secure connection between a local device or network and a remote mobile device. The present invention further extends to secure communication between local and remote devices that is enabled via a spontaneous virtual private network established between the devices. Additional embodiments of the present invention include secure exchange of data between local and remote devices that employ differing communication protocols. The ability of the invention to supercede dissimilar protocols in establishing secure communications further enables additional functionality within the system, including data buffering and additional firewall functionality. The present invention can also enable simplified user authentication for a remote device when interacting with multiple applications disposed at a local network, thereby streamlining usage of the application by the remote device user.

Embodiments of the present invention include or are incorporated in computer-readable media having computer-executable instructions or data structures stored thereon. Examples of computer-readable media include RAM, ROM, EEPROM, CD-ROM or other optical disk storage, magnetic disk storage or other magnetic storage devices, or any other medium that can be used to carry or store desired program code means in the form of computer-executable instructions or data structures and which can be accessed by a general purpose or special purpose computer. When information is transferred or provided over a network, tunnel, channel or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data that cause a general purpose computer, special purpose computer, or special purpose processing device to perform a certain function or group of functions. The computer-executable instructions and associated data structures or modules represent an example of program code means for executing the steps of the invention disclosed herein.

The invention further extends to computer systems for enabling a remote user access to network data of a corporate network that is stored behind corporate network firewalls. This includes, but is not limited to, opening data tunnels that operate as virtual private networks between the corporate network and a data center, and transmitting network data through the data tunnels. Those skilled in the art will understand that the invention may be practiced in many environments with many types of computer and telephone systems, including portable computers, telephones, wireless telephones, PDA's, personal computers, multi-processor systems, network PCs, minicomputers, mainframe computers, and the like.

1. System Environment

Reference is first made to FIG. 1, which shows one embodiment of a system for enabling secure communication between a local network and a remote device, the system being generally designated at 10. As described, the system 10 generally comprises several components, including a corporate network 12, a carrier network 14, and a remote device 16. In particular, FIG. 1 illustrates systems and methods of the present invention for enabling a user of the remote device 16 to access network data 18 and/or one or more software applications 20 of the corporate network 12 through a data tunnel 22 initially established between the corporate network 12 and carrier network 14, and between the carrier network and the device 16, respectively. In one embodiment, the corporate network 12 is a business computer network containing network data 18 and applications 20 that are protected behind a firewall 24 to prevent unauthorized access.

As used herein, the term "corporate network" should be broadly construed to include any computing environment where tasks are performed by processing devices that are linked together. The corporate network 12 can include, for example, the computing environment or network of any enterprise, business, corporation, individual, or other entity. In the corporate network 12, computer-executable instructions and program modules for performing the features of the invention may be located in local and remote memory storage devices. The term "corporate" used in this context does not require the entity that operates the network to have any business or organizational structure.

The term "remote device" is understood to include a variety of electronic devices and apparatus that are remotely disposed with respect to the corporate network. Examples of a remote device include a mobile or cellular phone, PDA, pager, laptop computer, etc. The remote device can be capable of receiving, executing, and transmitting computer-executable instructions.

The terms "network data" and "business network data" should be construed to include any data that is stored in local and remote memory storage devices and is accessible to the corporate network 12. Network data 18 may include for example, email data or web page data. In one embodiment, network data 22 is protected behind a firewall infrastructure that includes the firewall 24. It should be appreciated, however, that network data 22 can include any data that is accessible to the corporate network 12, even if it is not protected behind the firewall infrastructure. Similarly, the term "application" should be broadly construed to include any set of computer executable instructions for performing one or more functions in connection with a computer or other electronic device.

The term "tunnel" should be interpreted to include any channel or other line of communication through which data can be securely transmitted. One skilled in the art will appreciate that there are numerous protocols and methods of encryption and authentication that can be employed to enable secure communication through a tunnel, such that the data transmitted through the tunnel is delivered only to an identified user who is authorized to access said data. It should further be appreciated that the terms "tunnel," "data tunnel," and "channel," are interchangeable, as used herein. The tunnel operates as a virtual private network by enabling secure remote access to network data through a business's firewall infrastructure.

According to the present invention, as shown in FIG. 1, a data tunnel leg 22A is established between the corporate network 12 and the carrier network 14, and a data tunnel leg 22B is established between the carrier network and the remote device 16. The data tunnel legs 22A and 22B are used to transmit data between the corporate network 12 and the device 16. Specifically, the data tunnel leg 22A in one embodiment is established and maintained as a continuously open data tunnel between the corporate network 12 and the carrier network 14, through which information can be transmitted from the corporate network 12 for eventual receipt by the remote device 16. The data tunnel leg 22B is also established as a tunnel between the remote device 16 and the carrier network 14 to enable the transfer of information between the remote device and the corporate network 12. The data tunnel leg 22B in one embodiment is only opened as the need for data to be either transmitted from or received by the remote device 16 is present. Thus, in contrast to the data tunnel leg 22A, which is continuously established, the data tunnel leg 22B in one embodiment is intermittently established as the need for communication arises. This arrangement can be preferable in cases where the remote device 16 comprises a battery operated device, such as PDA, where power resources are to be conserved when possible.

In general, to establish the data tunnel leg 22A, the corporate network 12 transmits a connection signal 50A to the carrier network 14. In response, the carrier network 14 establishes the data tunnel leg 22A with the corporate network 12. Similarly, the remote device 16 transmits a connection signal 50B to the carrier network 14, which establishes the data tunnel leg 22B in response. In the illustrated embodiment, the carrier network 14, in establishing the respective data tunnel leg, can send a connection signal reply 53 to the corporate network 12, the remote device 16, or both. It is appreciated, however, that the connection signal reply 53 is not essential in establishing the data tunnel legs 22A or 22B. More details concerning the establishment of the data tunnel legs 22A and 22B are given below.

As used herein, the term "connection signal" should be broadly construed to include data comprising a uniform resource identifier ("URI"), which represents a request for the carrier network to provide access to a web page, hypertext markup language ("HTML") data, extensible markup language ("XML") data, or other data resources. The connection signals 50A and 50B made by the corporate network 12 and the remote device 16, respectively, can be performed independently of each other, or in concert, according to system design. Likewise, the carrier network 14 is preferably configured to respond to each connection signal 50A and 50B independently, though the response to both the corporate network 12 and the remote device 16 by the carrier network can, if desired, be coordinated to occur simultaneously.

In the case of the corporate network 12, the data tunnel leg 22A, once established, is maintained by a keep alive signal 51. In one embodiment, the keep alive signal 51 comprises a small amount of nominal data sent to the corporate network 12 from the carrier network 14 in order to continually maintain the presence of the data tunnel leg 22A. This data is incrementally sent in packets having a size such as 100 bytes. In one embodiment, the keep alive signal 51 can comprise a nominal request for data from the corporate network 12. In response, the corporate network 12 can reply via the data tunnel leg 22A to the carrier network 14 with the requested data, thereby maintaining the tunnel leg 22A open. In a similar manner, the keep alive signal 51 is also sent by the carrier network 14 to the device 16 in order to maintain the presence of the data tunnel leg 22B when that leg is active.

As mentioned above, the data tunnel leg 22A between the corporate network 12 and the carrier network 14 is established repeatedly or on an ongoing basis so that the tunnel leg 22A is continuously available in the event that the remote device 16 attempts to establish the virtual private network connection with corporate network 12 described herein. For instance, the keep alive signal 51 can be sent on a periodic basis with a frequency, such as every 20 seconds, that is high enough to minimize the latency experienced by the remote device 16 when the remote device attempts to establish communication with the virtual private network. The connection signal 50A and the keep alive signal 51 transmitted between the corporate network 12 and the carrier network 14 can be performed automatically and in the background in preparation for the remote device 16 to eventually make the attempt to establish the virtual private network connection. In contrast, the connection signal 50B sent by the remote device 16 to the carrier network 14 is generally performed in response to input from a user of the remote device indicating that the user wishes to establish the virtual private network connection. In the case where multiple corporate networks are included in the present system, the initial connection signal 50B, or data subsequently transmitted over the tunnel leg 22B can identify the target corporate network 12 with which the device is to communicate.

In the case of the corporate network 12, the connection signal 50A, the keep alive signal 51, and the connection signal reply 53 are transmitted through the firewall 24. One skilled in the art will appreciate that the firewall 24 can include hardware, software, or a combination of both. Essentially, a firewall is a security mechanism that prohibits access through designated ports of a network and ensures network data cannot be accessed from an unauthorized user from outside of the firewall. Though only one firewall 24 is shown, multiple firewalls can be employed to afford enhanced data protection, if needed. The connection signal 50A, the keep alive signal 51, and any connection signal reply 53 relating to the corporate network 12 can also pass through one or more proxy servers 82 that are employed in conjunction with the firewall 24 as a security feature.

As shown in FIG. 1, the carrier network 14 receives the connection signals 50A and 50B and transmits keep alive signals 51 using a server. In the present embodiment, a web server, or sVPN server 60, operating as a component of a spontaneous virtual private network ("sVPN") is utilized. Though only one sVPN server 60 is depicted in FIG. 1, it should be appreciated that the carrier network 14 can comprise multiple web and/or sVPN servers to enable the carrier network 14 to communicate with multiple corporate networks/remote devices and to maintain multiple data tunnels (not shown). The sVPN servers or web servers are examples of "tunneling servers" that operate with tunneling clients as described herein to establish data tunnels between computing networks and remote devices. It should be appreciated that, according to the present invention, multiple data tunnels can be established between a single corporate network or remote device and a single web server, or between a single corporate network or remote device and multiple web servers.

The corporate network 12 and the remote device 16 use an sVPN corporate client 52 and an sVPN device client 54, respectively, to transmit their respective connection signals 50A and 50B to the carrier network 14 and to receive the connection signal reply 53 in response. "Connection signal reply" should be construed to include any data transmitted by the carrier network 14 in response to receiving the connection signal 50A or 50B and which is transmitted in an ongoing manner so as to keep open the tunnel legs 22A and 22B between the carrier network 14 and the corporate network 12, and between the carrier network and the remote device 16, respectively. The sVPN corporate client 52 is an example of a "network client" that operates in the network with which the remote device communicates. Similarly, sVPN corporate client 52 and sVPN device client 54 are examples of "tunneling clients" that reside, respectively, on the network and the remote device and establish data tunnel legs that are connected to form a complete data tunnel as described herein.

As mentioned, data entering or exiting the corporate network 12 must pass through the firewall 24, which acts as a security feature to prevent unauthorized access to the network. In the present invention, penetration of the firewall 24 by the transmission and reception of the connection signals 50A, the keep alive signal 51, and the connection signal reply 53 is accomplished due to the fact that the data are packetized in a TCP/IP or another appropriate format typically associated with web traffic. Thus, transmission of the connection signal 50A, the keep alive signal 51, and the connection signal reply 53 is performed via ports already established through the firewall 24 that are reserved for web traffic, thereby eliminating the need for establishing additional ports through the firewall and simplifying data transmission.

The corporate client 52, the device client 54, and the sVPN server 60 incorporate software for implementing sVPN communication technology, which includes software for initiating or responding to the connection signals 50A and 50B and, as will be described below in further detail, software for transcoding data between protocols, as needed. In turn, this enables the corporate client 52 and the device client 54 to establish the secure data tunnel legs 22A and 22B, respectively, with the sVPN server 60, as referred to earlier. Because a traditional VPN interface between these components is avoided, the challenges corresponding to typical VPN installations are avoided as well. In particular, because the data tunnel legs 22A and 22B are established by sending outgoing connection signals that permit ports to be opened through the firewalls, the virtual private network is established without requiring VPN hardware at the corporate network 12 that is otherwise required in conventional VPN systems. Further details regarding the establishment and use of sVPN connections with components similar to those discussed above can be found in U.S. patent application Ser. No. 09/767,465, entitled "Spontaneous Virtual Private Network Between Portable Device and Enterprise Network," which was filed Jan. 22, 2001, and which is incorporated herein by reference in its entirety.

The sVPN component of the corporate network 12 in the present discussion is characterized as a corporate client that is located on a computer server or similar component within the corporate network. The present invention is not so limited, however. Indeed, in one embodiment, the sVPN component can be implemented as a desktop client located on a desktop computer within the corporate network 12. In such an implementation, the desktop client can reside as a WIN 32 application on the computer, for example. The example illustrated in FIG. 1 is therefore exemplary with regard to the variations possible with this component of the present system.

Figure 2:
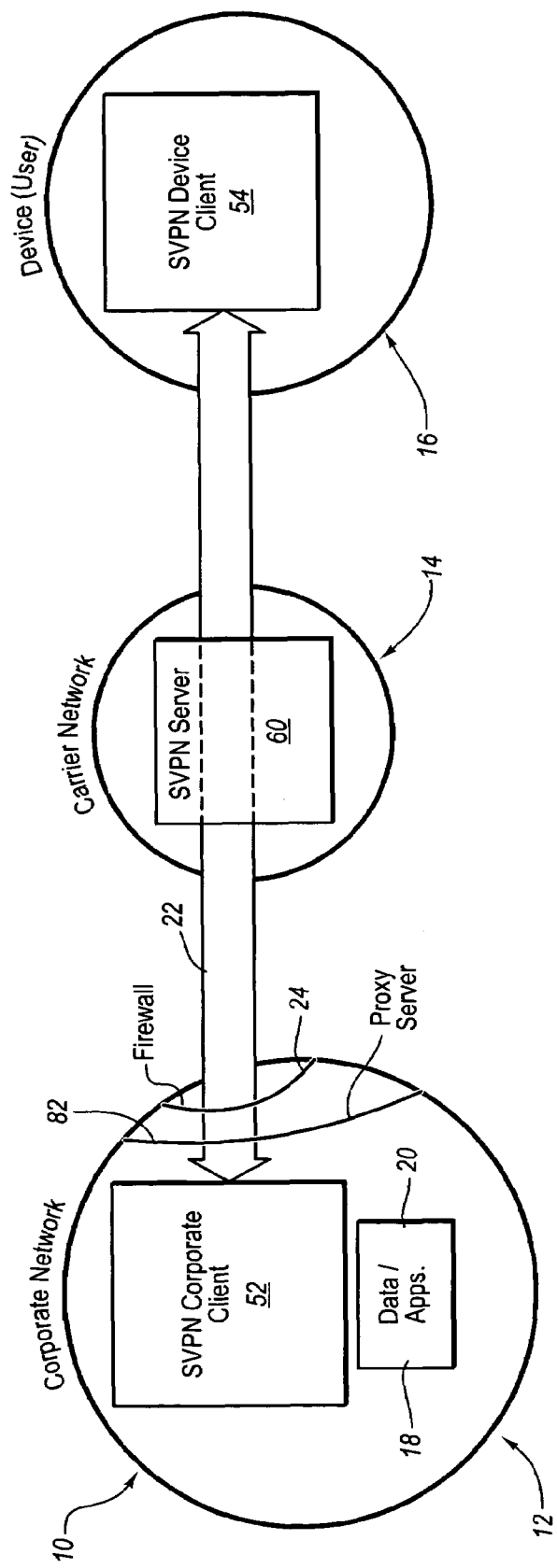
FIG. 2 is a block diagram showing the system of FIG. 1 in a second state according to one embodiment of the present invention.

Reference is now made to FIG. 2, which shows the data tunnel 22 established from the corporate client 52 of the corporate network 12 to the device client 54 of the remote device 16. As will be explained, the formation of the data tunnel leg 22A between the corporate client 52 and the sVPN server 60 of the carrier network 14, and the data tunnel leg 22B between the sVPN server and the device client 54 via the connection signal/connection signal reply interaction discussed above, enables the sVPN server to broker the linkage of the two data tunnel legs and operatively form the complete data tunnel 22 from the corporate network 12 to the remote device 16. The data tunnel 22 enables secure data transfer to occur between the remote device 16 and the corporate network 12, and more specifically, between and through sVPN-enabled devices, such as the corporate client 52, the device client 54, and the sVPN server 60. It is appreciated that in presently preferred embodiments, access between the corporate client 52 and the carrier network 14, and between the carrier network and the device client 16 is implemented, either wholly or partially, via the Internet. By extension, therefore, each of the above components is configured to transmit and receive data via the Internet.

The corporate client 52 and device client 54 monitor their respective tunnel legs 22A and 22B to ensure that the tunnel 22 remains open when needed. If for any reason the tunnel leg 22A or 22B is undesirably closed, the respective client opens a new data tunnel leg with the sVPN server 60 of the carrier network 14 by transmitting a new connection signal to the carrier network 14. Once a new tunnel leg is established, the sVPN server 60 brokers the linkage of the tunnel leg between itself and the respective client with the previously established tunnel leg of the other client. Although several acts are described herein as being specifically performed by the corporate client 52 or the device client 54, it should be appreciated that inasmuch as the corporate network 12 includes the corporate client, and inasmuch as the remote device 16 includes the device client, any acts performed by the corporate client are also acts performed by the corporate network, and acts performed by the device client are also acts performed by the remote device. In an alternative embodiment, the sVPN server 60 specifically monitors the data tunnel leg 22A and merely notifies the corporate network 12 if the leg is closed or lost for some reason. The corporate network 12 can then take steps to reestablish the data tunnel leg 22A.

The data tunnel 22 between the corporate client 52 and the device client 54 in presently preferred embodiments uses transmission control protocol/internet protocol ("TCP/IP"), hypertext transfer protocol with secure sockets layer protocol ("HTTPS"), IP security protocol ("IPsec"), or other appropriate protocols for data transfer. Using these protocols, connection signals, network data, connection signal replies, and other access requests are encrypted in packets and transmitted through the data tunnel 22 using "port 443" (not shown) of the corporate network 12. Port 443 is typically open to enable users to access the Internet from the corporate network 12, within the firewall 24.

As described, the present invention uses preexisting open ports in the firewall infrastructure to enable secure, VPN-related communication from remote mobile locations. Accordingly, it should also be appreciated that the present invention is an improvement over the prior art because additional ports are not required to be opened in the firewall infrastructure, which would require the use of traditional VPN hardware and software that is expensive and time-consuming to install and to maintain. Furthermore, the present invention enables a proxy server to filter any data packets transmitted through the ports to ensure compliance with the defined protocols.

Figure 3:
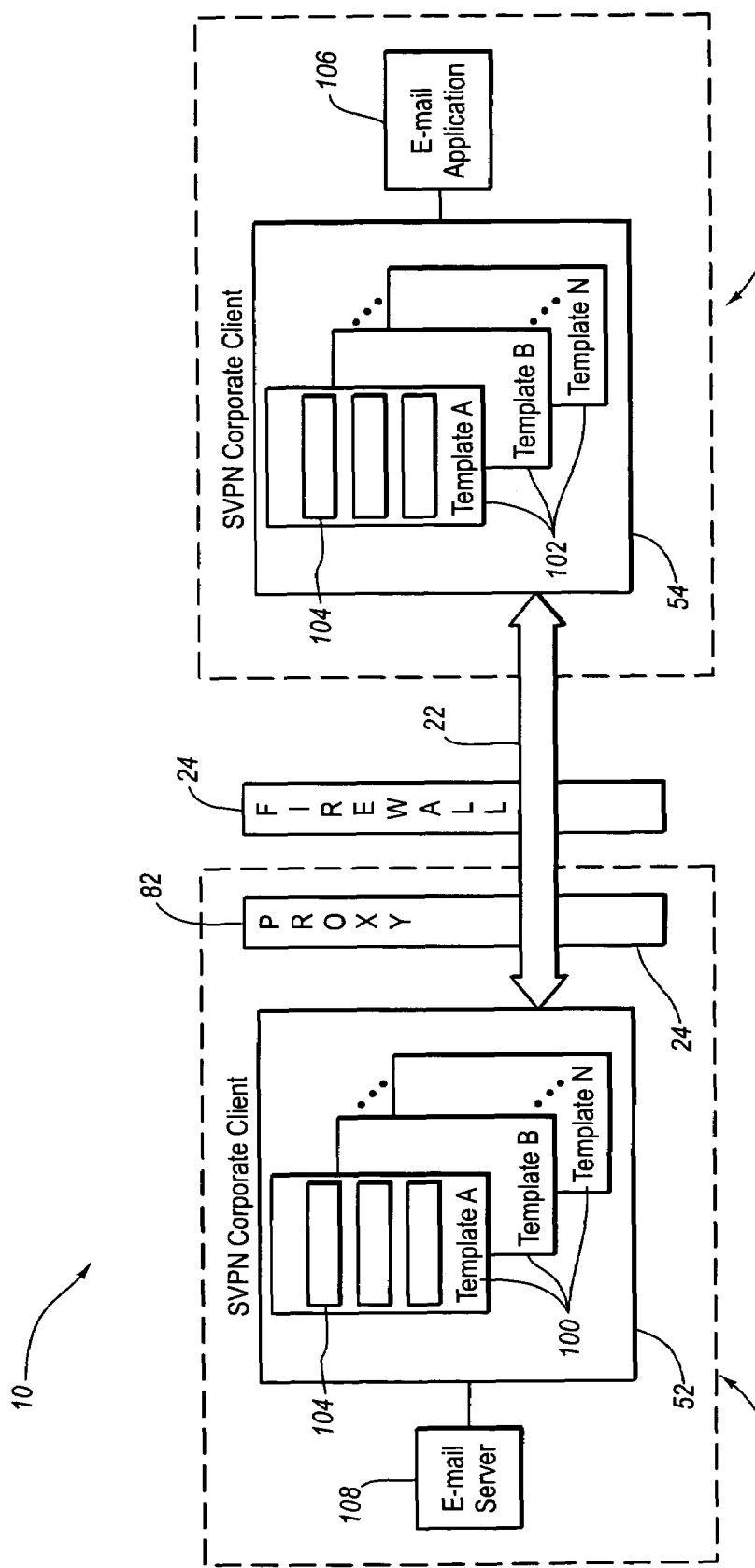
FIG. 3 is a block diagram of several of the components shown in FIG. 1, including protocol templates that are employed therein.

Reference is now made to FIG. 3, which depicts various details relating to the corporate client 52 and the device client 54. For clarity, some other components comprising the system 10 in this and following figures have been omitted. As illustrated, both the corporate client 52 and the device client 54 include a plurality of software templates 100 and 102, respectively. Each template 100 and 102 is configured for a specific protocol used in transmitting data between the corporate client 52 and the device client 54. Accordingly, FIG. 3 shows a plurality of N templates 100, designated template 100A, 100B, . . . , 100N, disposed in the corporate client 52. Similarly, the device client 54 includes N templates designated 102A, 102B, . . . , 102N. Each similarly designated template pair in the corporate client 52 and device client 54 is identical as to the protocol each template represents, (e.g., the protocol format contained in template 110D (such as Instant Messenger protocol) is identical to that contained in template 102D, which also pertains to the Instant Messenger protocol). Despite this similarity, in one embodiment each template 100 located in the corporate client 52 contains the actual protocol code, while the templates 102 located in the device client 54, though identical in protocol format, merely contain the protocol formatting and not the actual protocol code. This is done so as to preserve the limited memory and processing resources of the remote device 16.

The templates 100, 102 are employed to assist the transfer of information, such as application data, commands, etc., between the corporate client 52 and the device client 54. Specifically, each template 100, 102 enables data transfer according to a specific communication protocol, as already mentioned. To that end, each template 100 and 102 further includes one or more inflection points 104 that correspond to commands or other data aspects that are unique to the respective protocol.

For instance, a template pair 100A/102A can be configured to correspond to a POP e-mail protocol used in transferring e-mail commands and/or data between the corporate network 12 and the remote device 16. As such, each template 100A and 102A will include a plurality of inflection points 104 that can contain the various commands and data specific to the POP protocol. This enables the templates 100A and 102A to be utilized in transmitting POP e-mail data between a POP-based e-mail application 106 disposed in the remote device 16, and a POP e-mail server 108 at the corporate network 12, both of which are shown in FIG. 3.

In another example, a template pair 100/102 can be configured that corresponds to the Instant Messenger protocol, which includes four main tasks that can be executed by the instant messenger application: send a message, receive a message, retrieve a buddy list, and login. Accordingly, the template pair 100/102 corresponding to the instant messenger protocol contains at least four inflection points, each corresponding to one of the four tasks above that can be performed by the instant messenger application. Template pairs 100/102 can be readily modified or added so as to accommodate new protocols or inflection points that are introduced within the present system 10 as described herein.

The corresponding pair of templates 100 and 102 can be configured to correspond to any one of a variety of protocols; thus the examples illustrating both the type and number of templates as given herein are meant to be merely exemplary. Further, though FIG. 3 illustrates an e-mail application 106 being associated with the remote device 16 and an e-mail server 108 associated with the corporate network 12, it should be appreciated that a wide range of applications and/or programs can be utilized in connection with the present system for enabling secure communications between a corporate network and a remote device.

2. Remote Access to Network Data

Reference is now made to FIGS. 2 and 3 together. The system and to environment just described is suitable for practicing the methods of the present invention for enabling secure data intercourse between a remote device and a corporate network through a spontaneous virtual private network arrangement. According to these methods, a user wishing to remotely access network data, such as the e-mail information contained on the e-mail server 108 of the corporate network 12, opens a line of communication, or the data tunnel leg 22B, with the carrier network 14 using the remote device 16, which in this example comprises a web-enabled PDA. The data tunnel leg 22B is established using the connection signal/connection signal reply mechanism for establishing connectivity between the remote device 16 and the carrier network 14, as described above. Concurrent with or prior to the establishment of the data tunnel leg 22B, the data tunnel leg 22A is established between the corporate network 12 and the carrier network 14 using the same connection signal/connection signal reply routine discussed above.

In conjunction with these procedures, presently preferred embodiments also include device and user authentication and security procedures that ensure that the system is properly configured and that all users and system components are properly authorized. Specifically, a three-tiered regimen is utilized to accomplish the authentication and security tasks. The first tier comprises device authentication tasks for authenticating both the remote device 16 and the corporate network 12. When either the remote device 16 or the corporate network 12 attempts to establish a data tunnel leg with the sVPN server 60, its respective client transmits, along with or following the connection signal 50A or 50B, an identification code, such as a client identification ("CID"). The CID is an encrypted certificate that authenticates the corresponding client as one that is valid for transacting data with the present system 10. Upon receipt of the CID, the sVPN server 60 can authenticate that client, and hence its host (i.e., the corporate client 12 or the remote device 16) as a component of the system 10. As will be seen, the CID of each client 52 and 54 will be used in later tiers in connecting the data tunnel legs 22A and 22B into a single data tunnel 22.

As mentioned, the transmittal of the CID and related data from either of the device 52 and 54 to the sVPN server 60 is encrypted. In the present embodiment, this encryption is accomplished using x.509 certificates. The x.509 certificate can be used as a digital signature to ensure the various components to be used in transacting data within the system via the sVPN server 60 are valid devices. In one embodiment, the sVPN server 60 is pre-loaded with the required digital signature and certificate data during manufacture so as to enable the sVPN server to validate these digital signatures later during operation.

As a result of the first tier device authentication procedure above being completed, data tunnel legs 22A and 22B are established between each device 52 and 54 and the sVPN server 60. Before the complete data tunnel 22 is formed and data can be transacted between the corporate network 12 and the remote device 16, however, the other two tiers of the security and authentication tasking must also be completed. In the second tier, various security procedures are performed to enable secure data transfer. First, a session key is created for use by the corporate client 52 and the device client 54. In the present embodiment, this step is performed using an RSA algorithm, which creates a 2,048-bit session key. These steps are preferably performed by the device client 54 of the remote device 16 and transmitted via the sVPN server 60 to the corporate network 12, where the session key is received by the corporate client 52. In alternative embodiments other components, such as the corporate client 52, can create the session key.

After the session key is created, it is used to set up the encryption protocol that will be used during data transmission between the corporate network 12 and the remote device 16. In the present embodiment, RC-4 techniques are used to set up the data encryption based on the session key. Then, a message digest, such as MD-5, is used to ensure that the encryption is accurately performed and is not corrupted by extraneous events.

As a result of these various security devices and algorithms, secure encryption of data to be transmitted between the various components is ensured. At this point, the x.509 certificate created in the first tier is terminated, and the full data tunnel 22 from corporate network 12 to remote device 16 is established by the sVPN server 60, as shown in FIGS. 2 and 3.

Once the complete data tunnel 22 is established, the third tier of the security and authentication regimen can be executed, wherein the corporate network 12 authenticates the identity of the user of the remote device 16 to verify that the user has authority to access the corporate network before data is transacted. In one embodiment, the user's identity is authenticated when the user enters a personal identification number. In another embodiment, the user's identity is confirmed over the Internet using encryption technology, such as twin-key encryption, with corresponding public and private keys assigned to the user. Those skilled in the art will recognize there are various methods for authenticating the identity of a user, any of which may be used in accordance with the present invention. Other such methods for authenticating the identity of a user include, but are not limited to, tokens and smart cards. More details concerning user authentication are given further below.

It is appreciated that, despite the details given herein, other methods can be used to provide the security and authentication results obtained by the above three-tiered regimen. Additionally, any one of the three tiers can substituted with an alternative procedure that substantially accomplishes the same task. Finally, though all three tiers are preferably practiced in connection with the present invention, it is appreciated that less than three tiers—or, alternatively, more than three tiers—can be utilized in establishing the present system 10 for secure data exchange.

Once all three security and authentication tiers are satisfied, the user, by way of the device client 54 of the remote device 16, can transmit along the data tunnel 22 an access request to the corporate network 12 (via the sVPN server 60), which is received by the corporate client 52. The access request can include any request requiring access to network data 18 or applications 20. For example, the access request can include a request to receive access to email messages, web pages, document files, or other data of the corporate network 12. As illustrated in FIG. 3, the e-mail application 106 of the remote device can issue an access request via the device client 54 to receive e-mail information from the e-mail server of the corporate network 12. As such, the access request is packetized by the device client 54 of the remote device 16 and transmitted using data tunnel 22.

It is noted here that once the data tunnel 22 is established and all authentication and security procedures have been met, the sVPN server 60 preferably does not interact with (i.e., caching, transcoding, decrypting, etc.) access requests, access replies, or any other data being transferred between the remote device 16 and the corporate network 12, but merely enables the data transfer to pass through it.

Like the connection signals 50, the keep alive signal 51, and the connection signal replies 53 discussed above, the access request transmitted by the device client 54 in the present embodiment comprises a protocol structure that enables it to be transmitted as web traffic. In particular, each packet comprising the access request includes an http header or similar protocol identifier that will cause the firewall 24 and the proxy 82 to recognize the packet as web traffic and allow its passage through the designated port of the corporate network 12, in this case, port 443. An underlying protocol, such as IPSec, also resides in the packet and contains the actual data pertaining to the access request. This arrangement of the data packets comprising the access request transmitted by the device client 54 thus allows them to pass through a port already open for such traffic, thereby avoiding the need to open yet another port through the firewall 24. Any packets comprising the response by the corporate client 52 to the access request of the device client 54 are also packaged in this manner such that they too pass freely through the firewall 24, as will be seen.

The above access request, originally produced by an application and sent by the device client 54 of the remote device 16, is transmitted via the data tunnel 22 using the corresponding template 102 of the device client 54. For example, the access request can pertain to a request for e-mail header information to be used by the e-mail application 106 of the remote device 16. As such, the access request is transmitted using the template 102A pertaining to such an e-mail header request. The inflection points 104 of the template 102A correspond to such an e-mail header request. Again, the access request can comprise any one of a variety of request types, and the templates 100 and 102 can be configured to pertain to one of these types. It is noted that, in this configuration, the e-mail application 106 of the device client 54 interprets the template 102 as representing the application or server that is actually located in the corporate network 14. As such, the template 102 acts as a "proxy" for that corporate application or server, in this case, the e-mail server 108.

As seen in FIG. 3, the templated access request transmitted by the device client 54 is received via the data tunnel 22 by the corporate client 52 after passing through the sVPN server 60, the proxy server 82, and the firewall 24. Again, because the access request is transmitted in preferred embodiments in a web traffic configuration, the firewall 24 allows it to pass through a port already open for such traffic, thereby avoiding the need to open yet another port therethrough.

The corporate client 52 then matches the access request to the appropriate template 100 before forwarding it to the designated application in the corporate network 12. For instance, continuing the above example, the e-mail header access request sent from the device client 54 is received at the corporate client 52 and is matched to the appropriate template 100A. The data contained in the inflection points 104 of the template 100A are then extracted and sent to the e-mail server 108, where the access request is processed and the requested data is forwarded to corporate client 52 in response to the access request. As was the case with the device client 54, the e-mail server 108 interprets the template 100A as representing the e-mail application 106 that is actually remotely located in the remote device 16. Thus the template 100A acts as a proxy for the e-mail application 106.

The manner in which the access request is responded to can be defined and/or limited by the corporate network 12. By allowing the corporate network 12 to control what acts are performed in response to the access request, the corporate network is able to maintain control over access to network data and applications and can control how these network elements are manipulated within the network. Predefined acts can include, but are not limited to, retrieving email headers, retrieving email message bodies, retrieving web page data, deleting email, faxing email data or web page data to the user, and transmitting other network data between the corporate client 52 and device client 54.

Once received by the corporate client 52, the data is packetized as an access response to the access request according to an appropriate template 100. The templated access response is then forwarded via the data tunnel 22 for receipt by the device client 54 in a similar manner to that described above. In one embodiment, the access response can be incorporated into the continual connection signal string being continually sent by the corporate client 52 to maintain the data tunnel leg 22A open, as described earlier.

In one embodiment, the transmission of data contained in an access response is performed via the data tunnel 22. In another embodiment, a second data tunnel (not shown) is established for the transmission of the access response. It is to be remembered that these data tunnels cooperate with the corporate client 52, the device client 54, and the sVPN server 60 in a spontaneous VPN configuration in enabling the secure transmission of data between the corporate network 12 and the remote device 16. In the case where a second data tunnel is implemented for data transfer, the second data tunnel can be established through the same port used for the data tunnel 22 (e.g., Internet port 80, port 443) or through a separate port.

In one embodiment, a null template pair (not shown) can be designated in the templates 100 and 102. The null template pair can be configured to capture and transmit data between the corporate client 52 and the device client 54 that has been compared with the other templates 100 or 102 of the corporate or device client and does not match with any of those templates. Such unmatched data can then be captured by the null template on either the corporate client side or the device client side and transmitted over to the null template of the other client. The respective client 54 can then forward the data according to pre-defined procedures. In this configuration, the null templates enable the spontaneous VPN system to operate similar to a traditional VPN configuration, wherein data is not collected and assigned according to protocol templates 100 and 102.

Figure 4A:
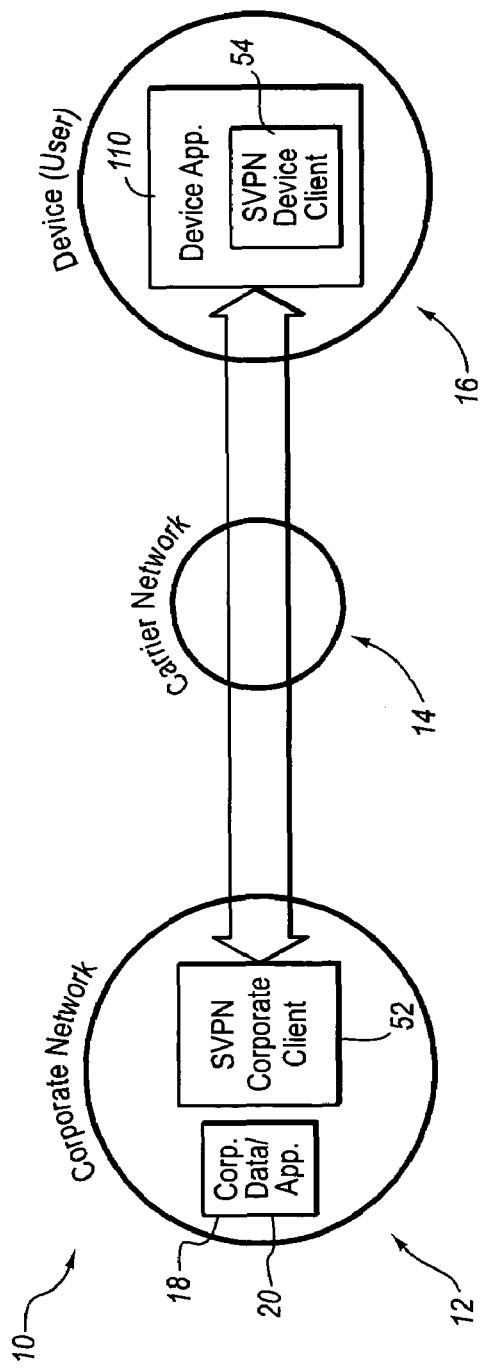
FIG. 4A is a block diagram depicting the operational relationship between local and remotes devices according to one embodiment.
Figure 4B:
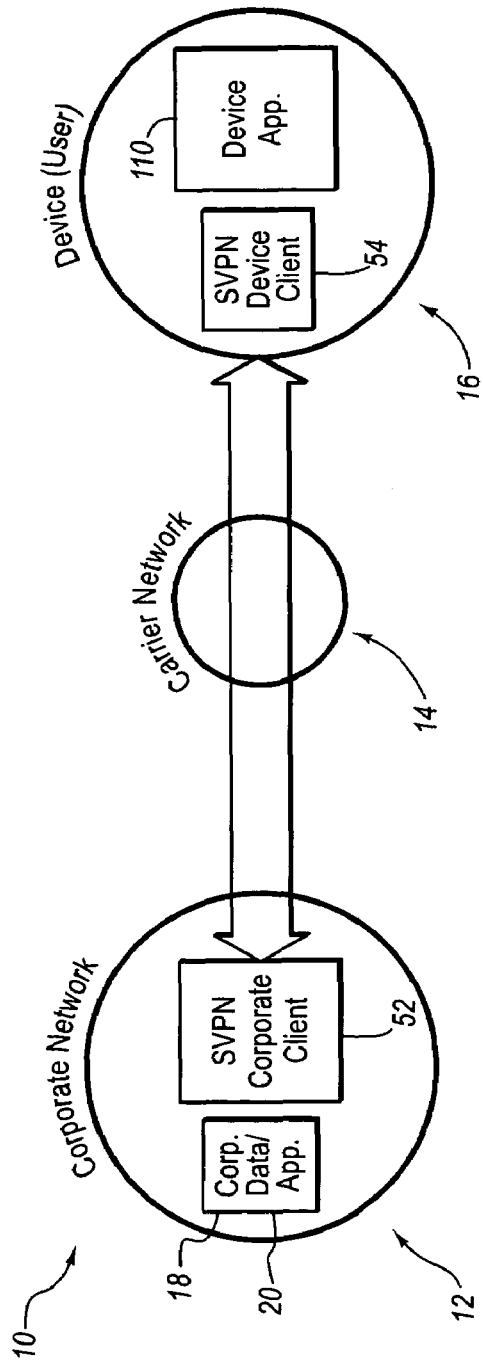
FIG. 4B is a block diagram depicting the operational relationship between local and remotes devices according to another embodiment.
Figure 4C:
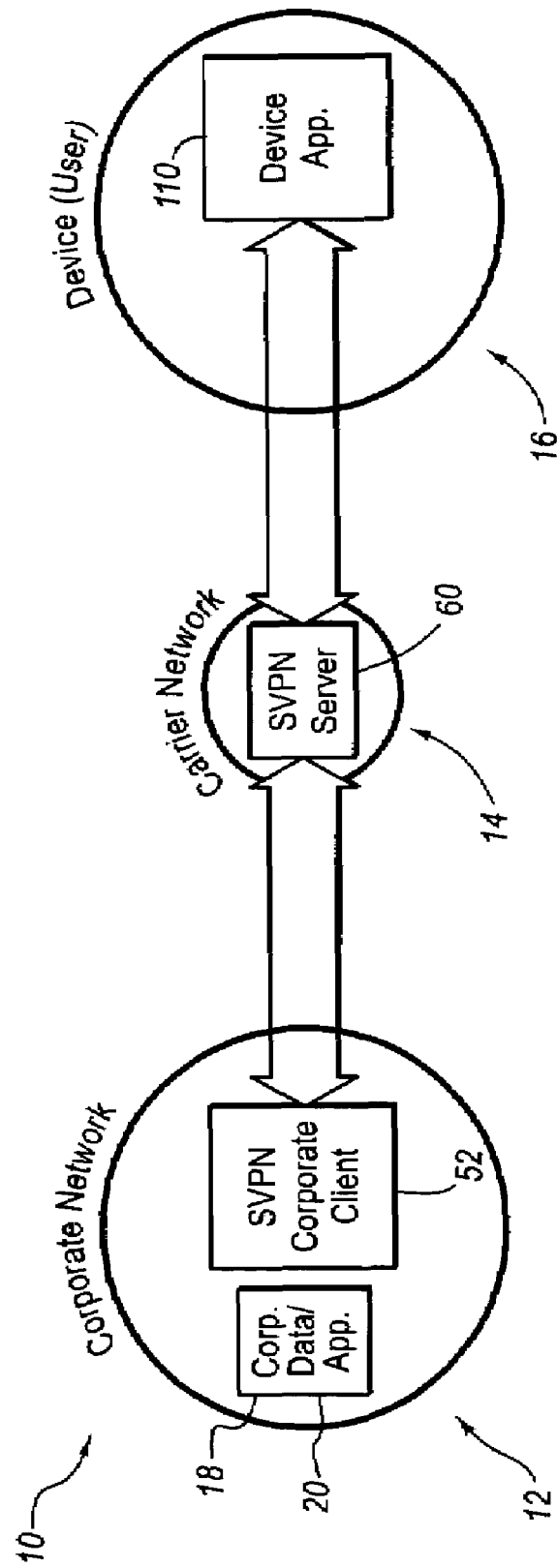
FIG. 4C is a block diagram depicting the operational relationship between local and remotes devices according to yet another embodiment.

It should be noted that more than one remote device can be utilized in connection with the corporate network 12 at any given time. Thus, the illustration of one remote device is merely exemplary. Similarly, multiple corporate clients disposed in one or more corporate networks can be utilized in accordance with the present teachings while still residing within the scope of this invention. Reference is now made to FIGS. 4A, 4B, and 4C in describing various techniques by which implementation of the present invention into network systems can be achieved. Note that the implementations to be described are merely exemplary; as such, other means of implementation can also be employed. In the first two implementations given below with respect to FIGS. 4A and 4B, it is noted that full encryption technology is preferably employed from device client 54 to corporate client 52 in order to secure the communications transmitted therebetween.

In FIG. 4A, a first means of implementation is depicted, wherein the device client 54 of the present system 10 is compiled into a device application 110 of the remote device 16. The corporate client 52 is disposed in a software configuration within the corporate network 12 as previously discussed. Thus, both the device client 54 and corporate client 52 are implemented as software modules in the corporate network 12 and remote device 16, respectively.

In FIG. 4B, both the corporate client 52 and the device client 54 are implemented as software modules, similar to FIG. 4A. In contrast to FIG. 4A, however, the present embodiment implements the device client 54 as a discrete software module being separately positioned with respect to the one or more device applications 110 that are located within the remote device 16. As before, the corporate client 52 resides as a software module within the corporate network 12. In this implementation, the device client 54 interacts with the device application 110 by implementing a port listener scheme by which the device client continuously monitors the port through which commands and data from the device application are sent and received. Once detected, this command and data information is intercepted by the device client 54 and manipulated for inclusion into an appropriate template 102 before being transmitted to the corporate client 52 via the carrier network 14 and sVPN server 60, as described earlier.

In FIG. 4C a third implementation is depicted, wherein a user interface, such as a user interface service ("UIS") is employed. Here, the UIS, in the form of a wireless application protocol ("WAP") browser, interacts with an application protocol from the corporate client 52 or device client 54 via the respective protocol template 100 and/or 102. As seen in FIG. 4C, for example, requested data from the corporate database 18 or application 20 is encrypted and forwarded by the corporate network 12 to the sVPN server 60 of the carrier network 14, again, using the template scheme discussed earlier. The sVPN server 60 or other component of the carrier network 14 then renders this data in a visual format before forwarding it on to the remote device 16. The device client 54 of the remote device 16 decrypts the visual data and further processes it as needed or desired. This embodiment can be implemented, among other things, in systems employing the WAP protocol, such as e-mail service for WAP-enabled mobile phones, for instance. Also, in embodiments incorporating the present UIS configuration, the UIS is normally located with the sVPN server at the carrier network 14. In such embodiments, the UIS can contribute security features to enhance those already associated with the present invention, if desired. For instance, in a UIS implementation employing WAP protocol, WTLS, which is a WAP-related security program, can be utilized to provide data protection and integrity.

3. Simplified User Authentication

Figure 5:
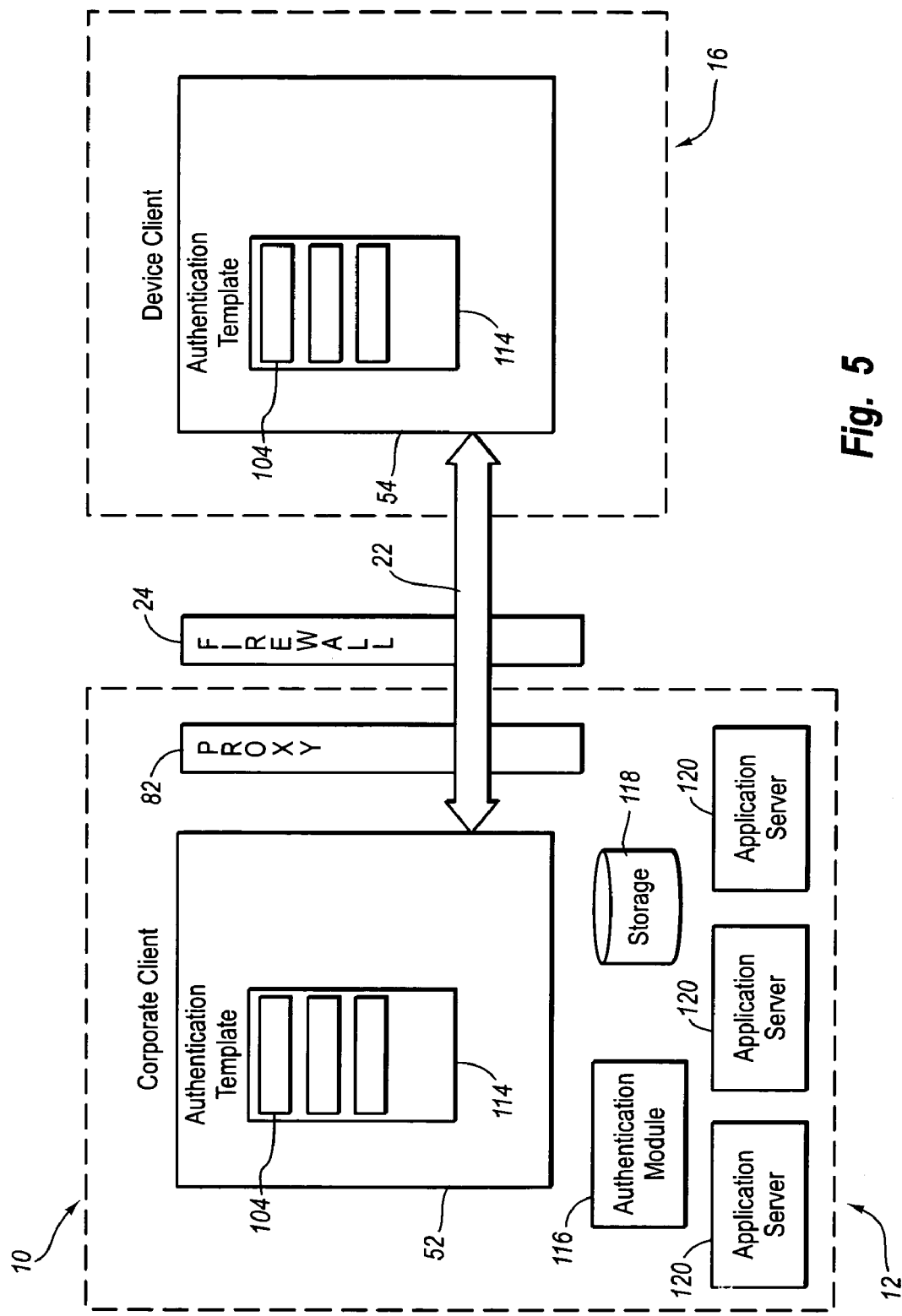
FIG. 5 is a block diagram illustrating various user authentication components of the present invention according to one embodiment.

Reference is now made to FIG. 5, depicting yet another embodiment of the present invention. As already mentioned, the data tunnel 22 is established by creating the data tunnel leg 22A from the corporate client 52 to the sVPN server 60, and the data tunnel leg 22B from the sVPN server 60 to the device client 54. The sVPN server 60 can then unite the two data tunnel legs 22A and 22B to form the complete data tunnel 22. Before enabling data to flow between the corporate client 52 and the device client 54, however, the corporate network 12 in executing the third tier of the three-tiered authentication and security regimen can require the user of the remote device 16 to be authenticated by the network. This can be accomplished by utilizing an authentication template pair 114, similar to the templates 100/102 described above. In one embodiment, the user enters appropriate security credentials, such as an NT domain password, radius security password, active security password, or custom password, into the device client 54. This security credential data is then input into the authentication template 114 of the device client 54. The templated security credential data is then forwarded via the data tunnel 22 to the corporate client 52, where it is received and input into the authentication template 114 of the corporate client. The security credential data is then forwarded to a security layer of the corporate network 12, including an authentication module 116, for user authentication. If authentication is successful, the security credential information can be preserved in a storage device 118, such as a 3DES encrypted database. Data can then be enabled by the corporate network 12 to flow between the corporate client 52 and the device client 54.

Once authentication by this or other similar method is accomplished, the security credential information can be synchronized by the corporate client 52 with the authentication/password requirements of other designated applications, such as application servers 120 in the corporate network 12 that the user of the remote device 16 may choose to access. This synchronization causes the user authentication requirements of each designated application server 120 to be met. This in turn enables the user to access the various applications without again having to enter appropriate security credential information, such as a password, for each application contained on the application servers 120, thereby streamlining and simplifying use of the network for the user. This synchronized authorization can be distributed as narrowly or as broadly as designated by the corporate network 12 and security administrator.

The present invention enables secure data transfer between remotely disposed components using a simplified connectivity infrastructure. This in turn enables data synchronization and access between a corporate network and a remote device. In particular, the synchronization of corporate data with remotely disposed devices, as well as the utilization and enablement of native device applications in conjunction with a corporate network, are provided for. It should be understood that, though the principles herein have been directed at implementation within a spontaneous virtual private network environment, these principles can also be largely applied to other data transport embodiments having varying hardware/software implementations, such as typical VPN configurations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   establishing a first data tunnel leg between a tunneling client of a computing network and a tunneling server of a carrier network;
   establishing a second data tunnel leg between the tunneling server of the carrier network and the tunneling client of a remote device; and causing transmission of data between the remote device and the computing network via the first and second data tunnel legs and the carrier network using a first template associated with a first protocol, the first template being used by the tunneling client of the computing network, and a second template associated with the first protocol, the second template being used by the tunneling client of the remote device, wherein each of the first template and the second template comprises one or more inflection points that correspond to commands or other data aspects that are unique to the first protocol.

2. A method as defined in claim 1, wherein the data transmitted between the remote device and the computing network comprises an access request that includes a protocol identifier that allows a firewall and a proxy on the computing network to recognize the data as web traffic and allow passage thereof into the computing network.

3. A method as defined in claim 2, wherein the first protocol comprises a Post Office Protocol (POP) e-mail protocol used in transferring e-mail commands or data between the computing network and the remote device.

4. A method as defined in claim 2, wherein:
the first protocol comprises an Instant Messenger protocol; and
each of the first template and the second template comprises four inflection points that correspond to four Instant Messenger tasks, including the tasks of:
send a message;
receive a message;
retrieve a buddy list; and
login.

5. A method as defined in claim 1, wherein establishing a first data tunnel leg comprises:
causing a first connection signal to be sent from the tunneling client of the computing network to a tunneling server of the carrier network; and
causing a connection reply signal to be sent from the tunneling server to the tunneling client on the computing network.

6. A method as defined in claim 5, wherein the first connection signal comprises a uniform resource identifier that represents a request for the carrier network to provide access to network data on the computing network.

7. A method as defined in claim 1, further comprising causing a keep alive signal to be sent from the computing network to the carrier network to maintain the first data tunnel leg.

8. A method as defined in claim 1, wherein the first connection signal is to be transmitted via a port that is established through a firewall on the computing network, wherein the port is otherwise specified for being opened and reserved for Internet traffic.

9. A method as defined in claim 5, wherein the first connection signal further comprises a first identification code which authenticates the computing network.

10. A method as defined in claim 9, further comprising causing a session key to be transmitted from the tunneling client of the remote device, wherein the session key is used to set up an encryption protocol that is to be used for communication between the remote device and the computing network.

11. A method as defined in claim 9, further comprising causing a session key to be transmitted from the tunneling client of the computing network, wherein the session key is used to set up an encryption protocol that is to be used for communication between the remote device and the computing network.

12. A method as defined in claim 9, further comprising causing transmission of identification data, from the remote device to the computing network, that is used by the computing network to authenticate the identity of a user operating the remote device.

13. A method as defined in claim 5, wherein establishing the second data tunnel leg second connection signal further comprises causing a second connection signal to be sent from the tunneling client of the remote device to the tunneling server.

14. A method comprising:
receiving a first connection signal from a computing network;
establishing a first data tunnel leg between a carrier network and the computing network in response to the first connection signal;
receiving a second connection signal from a remote device;
establishing a second data tunnel leg between the carrier network and the remote device in response to the second connection signal, the first data tunnel leg and the second tunnel leg together operating as a virtual private network; and
causing transmission of data between the remote device and the computing network via the first and second data tunnel legs using a first template associated with a first protocol, the first template being used by a tunneling client of the computing network, and a second template associated with the first protocol, the second template being used by a tunneling client of the remote device,
wherein each of the first template and the second template comprises one or more inflection points that correspond to commands or other data aspects that are unique to the first protocol.

15. A method as defined in claim 14, wherein the first protocol comprises a Post Office Protocol (POP) e-mail protocol used in transferring e-mail commands or data between the computing network and the remote device.

16. A method as defined in claim 14, wherein:
the first protocol comprises an Instant Messenger protocol; and
each of the first template and the second template comprises four inflection points that correspond to four Instant Messenger tasks including the tasks of:
send a message;
receive a message;
retrieve a buddy list; and
login.

17. A method as defined in claim 14, wherein the carrier network comprises a tunneling server that includes a user interface service that converts the data into a format that is configured to be visually displayed before sending the data to the remote device.

18. A method as defined in claim 14, wherein establishing the first data tunnel leg further comprises causing a connection reply signal to be sent to the computing network.

19. A method as defined in claim 14, wherein the first connection signal comprises a uniform resource identifier that represents a request for the carrier network to provide access to network data on the computing network.

20. A method as defined in claim 14, further comprising receiving a keep alive signal from the computing network to maintain the first data tunnel leg.

21. A method as defined in claim 20, wherein the first data tunnel leg is maintained substantially continuously and the second data tunnel leg is opened intermittently upon request from the remote device.

22. A method as defined in claim 14, wherein the first connection signal is to be transmitted via a port that is established through a firewall on the computing network, wherein the port is opened and reserved for Internet traffic.

23. A method as defined in claim 14, wherein, upon opening the second data tunnel leg, the first data tunnel leg and the second data tunnel leg comprise a single data tunnel leg wherein the remote device is configured to communicate with the computing network.

24. A method as defined in claim 14, wherein the first connection signal is received by a designated tunneling server on the carrier network, and wherein the designated server is one of multiple tunneling servers of the carrier network.

25. A method as defined in claim 14, further comprising receiving a session key from a device client on the remote device, wherein the session key is used to set up an encryption protocol that is to be used for communication between the remote device and the computing network.

26. A method as defined in claim 25, further comprising causing transmission of identification data, to the computing network from the remote device, that is used by the computing network to authenticate the identity of a user operating the remote device.

27. A method comprising:
causing transmission of a connection signal from a tunneling client of a device to a tunneling server of a carrier network, wherein a first data tunnel leg has already been established between the tunneling server and a remote computer network; and
causing a data request to be transmitted via the second data tunnel leg to the carrier network using a first template that is associated with a first protocol and is used by the tunneling client of the device, upon the establishment of a second data tunnel leg between the device and the carrier network in response to the connection signal;
causing receipt of the data request, at the remote computing network, from the carrier network via the first data tunnel leg; and
processing the data request, at the remote computing network, using a second template associated with the first protocol,
wherein each of the first template and the second template comprises one or more inflection points that correspond to commands or other data aspects that are unique to the first protocol.

28. A method as defined in claim 27, wherein the first protocol comprises a Post Office Protocol (POP) e-mail protocol used in transferring e-mail commands or data between the remote computing network and the device.

29. A method as defined in claim 27, wherein:
the first protocol comprises an Instant Messenger protocol; and
each of the first template and the second template comprises four inflection points that correspond to four Instant Messenger tasks, including the tasks of:
send a message;
receive a message;
retrieve a buddy list; and
login.

30. A method as defined in claim 27, wherein the connection signal comprises a uniform resource identifier which represents a request for the carrier network to provide to the device access to network data on the remote computing network.

31. A method as defined in claim 27, further comprising causing transmission of a session key from the tunneling client of the device, wherein the session key is used to set up an encryption protocol that is to be used for communication between the device and the remote computing network.

32. A method as defined in claim 31, further comprising causing transmission of identification data, to the remote computing network, that is used by the remote computing network to authenticate the identity of a user operating the device.

33. A method comprising:
causing transmission of a first connection signal from a tunneling client of a computing network to a carrier network;
transmitting a keep alive signal from the computing network to the carrier network to maintain a first data tunnel leg upon the establishment of the first data tunnel leg between the computing network and the carrier network; and
causing receipt of a data request from a remote device via the first data tunnel leg and a second data tunnel leg located between the carrier network and the remote device,
wherein the data request is caused to be transmitted using a first template associated with a first protocol, the first template being used by the tunneling client of the computing network, and a second template associated with the first protocol, the second template being used by a tunneling client of the remote device,
wherein each of the first template and the second template comprises one or more inflection points that correspond to commands or other data aspects that are unique to the first protocol.

34. A computer program product comprising at least one computer-readable storage medium having computer-readable program code portions stored therein, the computer-readable program code portions comprising:
program code instructions for establishing a first data tunnel leg between a carrier network and a computing network upon receiving a first connection signal from the computing network;
program code instructions for establishing a second data tunnel leg between the carrier network and a remote device, the first data tunnel leg and the second data tunnel leg together operating as a virtual private network; and
program code instructions for causing transmission of data between the remote device and the computing network via the first and second data tunnel legs using a first template associated with a first protocol, the first template being used by a tunneling client of the computing network, and a second template associated with the first protocol, the second template being used by a tunneling client of the remote device,
wherein each of the first template and the second template comprises one or more inflection points that correspond to commands or other data aspects that are unique to the first protocol.

35. A computer program product as defined in claim 34, wherein the first protocol comprises a Post Office Protocol (POP) e-mail protocol used in transferring e-mail commands or data between the computing network and the remote device.

36. A computer program product as defined in claim 34, wherein:
the first protocol comprises an Instant Messenger protocol; and
each of the first template and the second template comprises four inflection points that correspond to four Instant Messenger tasks including the tasks of:
send a message;
receive a message;
retrieve a buddy list; and
login.

37. A computer program product as defined in claim 34, further comprising program code instructions for maintaining substantially continuously the first data tunnel leg and the second data tunnel leg is opened intermittently upon request from the remote device.

38. A computer program product as defined in claim 34, further comprising program code instructions for causing transmission of the first connection signal via a port that is established through a firewall on the computing network, wherein the port is opened and reserved for Internet traffic.

39. A system for enabling a user of a remote device to access network data and software applications stored on a computer network, the system comprising:
a first tunneling client on the computer network;
a tunneling server on a carrier network, wherein:
the first tunneling client and the tunneling server are configured to communicate with each other and maintain a first data tunnel leg therebetween;
the tunneling server is configured to, upon receiving a connection signal from the remote device, establish a second data tunnel leg between the carrier network and the remote device which comprises a second tunneling client, the first data tunnel leg and the second data tunnel leg together operating as a virtual private network; and
wherein the second tunneling client is configured to cause transmission of data between the remote device and the computing network via the first and second data tunnel legs using a second template associated with a first protocol, the second template being used by the second tunneling client, and a first template associated with the first protocol, the first template being used by the first tunneling client,
wherein each of the first template and the second template comprises one or more inflection points that correspond to commands or other data aspects that are unique to the first protocol.

40. A system as defined in claim 39, wherein the second tunneling client is configured to generate the connection signal.

41. A method as defined in claim 1, wherein the tunneling client of the computing network comprises the first template and the tunneling client of the remote device comprises the second template.

42. A method as defined in claim 41, wherein the first template comprises a protocol code corresponding to the first protocol and the second template comprises a protocol format corresponding to the first protocol but not the protocol code.

43. A method as defined in claim 33, wherein the tunneling client of the computing network comprises the first template and the tunneling client of the remote device comprises the second template.

44. A method as defined in claim 43, wherein the first template comprises a protocol code corresponding to the first protocol and the second template comprises a protocol format corresponding to the first protocol but not the protocol code.

45. An apparatus comprising:
at least one processor; and
at least one memory including computer program code, the at least one memory and the computer program code configured to with the at least one processor, cause the apparatus at least to perform at least the following;
communicate with a first tunneling client on a computer network and maintain a first data tunnel leg therebetween;
establish a second data tunnel leg between the carrier network and the remote device upon receiving a connection signal from a remote device which comprises a second tunneling client, the first data tunnel leg and the second data tunnel leg together operating as a virtual private network; and
cause data to be transmitted between the remote device and the computing device via the first and second data tunnel legs using a second template associated with a first protocol, the second template being used by the second tunneling client of the remote device, and a first template associated with the first protocol, the first template being used by the first tunneling client of the computing network,
wherein each of the first template and the second template comprises one or more inflection points that correspond to commands or other data aspects that are unique to the first protocol.

46. The apparatus of claim 45, wherein the first tunneling client of the computing network comprises the first template and the second tunneling client of the remote device comprises the second template.

* * * * *

UNITED STATES PATENT AND TRADEMARK OFFICE
CERTIFICATE OF CORRECTION

| | | |
|---|---|---|
| PATENT NO. | : 7,673,133 B2 | Page 1 of 1 |
| APPLICATION NO. | : 10/794243 | |
| DATED | : March 2, 2010 | |
| INVENTOR(S) | : Wesemann et al. | |

It is certified that error appears in the above-identified patent and that said Letters Patent is hereby corrected as shown below:

Title page,
Item (63), Related U.S. Application Data, cancel ", application No. 10/794,243".

Column 10,
Line 28, "110D" should read --100D--.

Column 11,
Line 17, "system and to environment" should read --system and environment--.

Signed and Sealed this
Twelfth Day of July, 2011

David J. Kappos
*Director of the United States Patent and Trademark Office*